United States Patent Office 2,700,562
Patented Jan. 25, 1955

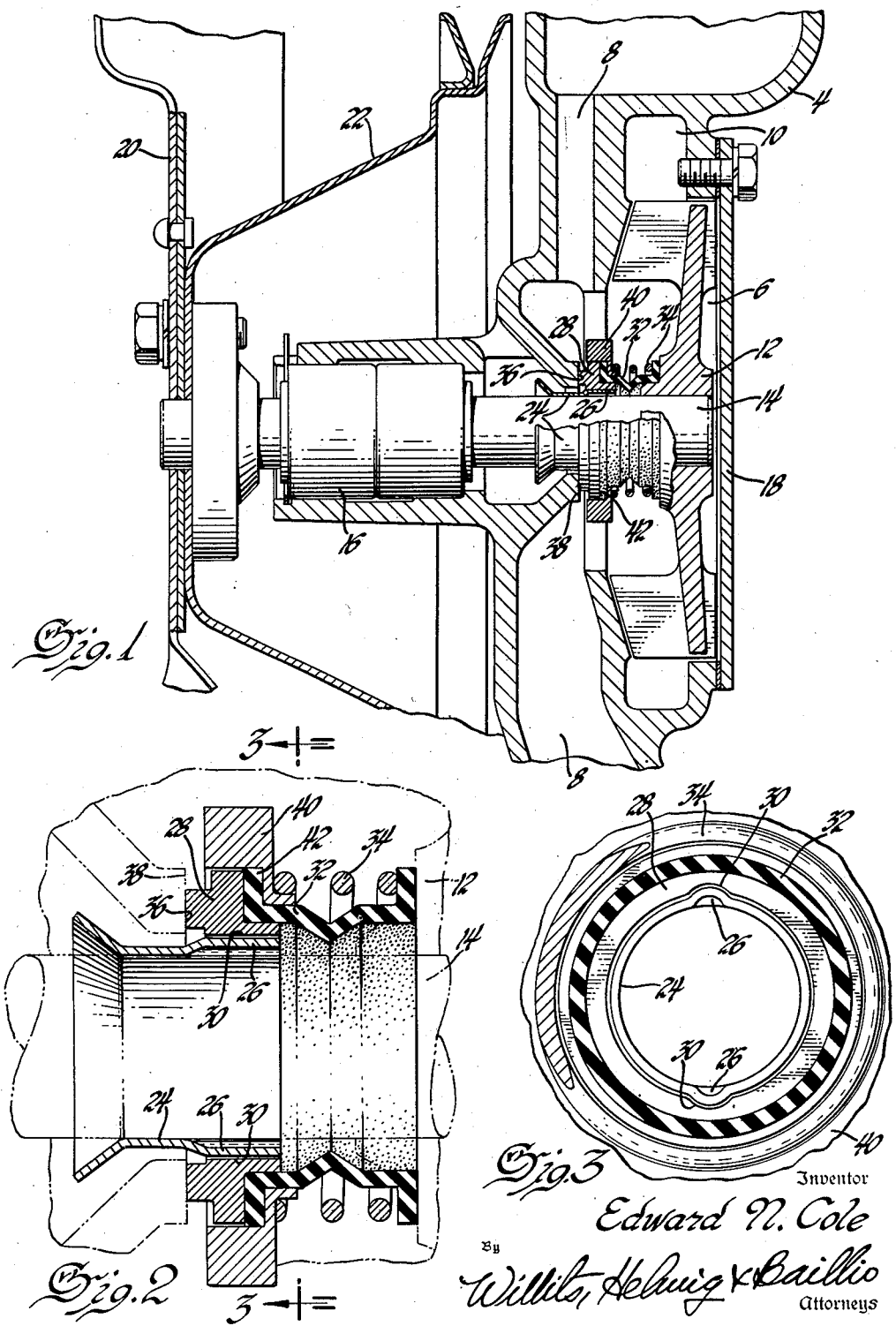

2,700,562

FLUID SEAL DAMPER

Edward N. Cole, Detroit, Mich., assignor to General Motors Corporation, Detroit, Mich., a corporation of Delaware Application October 4, 1949, Serial No. 119,411

2 Claims. (Cl. 286—11)

The present invention relates to rotary fluid seals and more particularly to means for preventing high frequency torsional vibration of water pump seals in internal combustion engines.

Rotary pump seals frequently consist of a spring biased sealing member carried by the rotary member and biased into engagement with a mating stationary sealing surface. Such sealing means must be resiliently mounted to permit the proper biasing action between the sealing surfaces. This creates a lubrication problem. This problem is severe in water pump seals where the coolant being circulated has very poor lubrication qualities. This absence of lubrication results in sufficiently high frictional forces to cause instantaneous seizing and release of the sealing member. This action causes torsional vibration of the sealing member at an audio frequency resulting in water pump seal noise. The present invention provides a means for absorbing and counteracting the torsional oscillation of the sealing member by resiliently mounted inertia damping means to thus eliminate this seal noise.

It is therefore an object of the present invention to provide a rotary seal with inertia damper means.

It is a further object of the present invention to provide a water pump seal having a resiliently mounted inertia damper means in which the resilient mounting is provided by a rubber sleeve conventionally used in such pumps.

It is a further object of the present invention to provide a water pump seal that is free from audio frequency torsional vibration.

Other objects of this invention will become apparent upon reading the specification and inspection of the drawing and will be particularly pointed out in the claims.

Referring to the figures in the drawing, Figure 1 is a sectional view of a water pump utilizing the present invention.

Figure 2 is a cross section of one embodiment of the present invention.

Figure 3 is a cross section along the lines 3—3 of Figure 2.

Referring more particularly to the figures in the drawing, 4 is a casing enclosing part of the cooling system. This casing has included therein a water pump cavity 6 with inlet ports 8 and exhaust ports 10 in communication with said cavity. A water pump impeller 12 is rotatably mounted in said cavity on a shaft 14 carried by a bearing 16. The cavity is closed by a cover plate 18. The shaft 14 also carries an air circulating or engine fan 20 and a pulley 22 for transmitting power to said fan and water pump impeller. The shaft 14 has rigidly mounted thereon a tubular member 24 having splines 26. The member 24 is normally a sheet metal element secured to the shaft 14 by a press fit so that it in effect becomes an integral part of the shaft. The sealing member 28 has mating spline detents 30 which engage the splines 26 of the member 24. This sealing element has freedom of longitudinal movement on the member 24 but is splined to this element by 26 and 30 so that it rotates with the shaft 14. The sealing element 28 has a resilient sleeve 32 of rubber, Neoprene or other suitable material attached thereto. The spring 34 holds the sleeve into engagement with the impeller 12 and the sealing member 28 to provide fluid tight joints between these three elements. The spring 34 also biases the surface 36 into engagement with the surface 38 of the casing 4, to provide a fluid tight rotary seal. The member 4 is normally of cast iron while the sealing member 28 may be of any rigid material providing a suitable sealing surface 36 for contact with mating surface 38. Such surfaces although efficient to prevent water leak, have a tendency to be noisy due to momentary seizure and release, setting up the torsional oscillation of audio frequency mentioned above. In order to damp out such torsional oscillation of the member 28, an inertia member 40 is provided. The inertia member 40 is resiliently mounted on the sealing member 28 through the resilient sleeve 32. The sleeve thereby provides the resilient element of a tuned torsional vibration damper system. The element 40 may be of any suitable material having sufficient mass to produce the required inertia action. This element acts as a seismic mass and tends to rotate at uniform angular velocity. It transmits energy to the element 28 when element 28 tends to seize with the surface 38 and absorbs energy from this element when the seizure is released. This transfer of energy between the element 28 and the element 40 through the section 42 of the sleeve 32 provides a torsional vibration damper to damp out vibrations which may otherwise appear in the element 28.

It is to be understood also that although the invention has been described with specific reference to a particular embodiment thereof, it is not to be so limited, since changes and alterations therein may be made which are within the full intended scope of this invention as defined by the appended claims.

I claim:

1. A fluid sealing means between a rotatable shaft and the wall surrounding the opening through which said shaft extends including; a sealing member carried by the rotatable shaft, means for biasing the sealing member into engagement with the wall surrounding said shaft, a resilient sleeve surrounding said shaft and forming a fluid-tight connection between said shaft and said sealing member, an inertia member secured to said resilient sleeve, said inertia member and the part of the flexible sleeve between said inertia member and said sealing member forming a tuned torsional vibration absorbing means whose resonant frequency approximates that of the torsional oscillation of said sealing member to be damped whereby this torsional oscillation is substantially neutralized.

2. A fluid sealing means between a rotatable shaft and the wall surrounding the opening through which the shaft extends and comprising, a sealing member carried by and rotatable with the shaft, means rotatable with said shaft for biasing said sealing member into engagement with said wall surrounding said shaft, a resilient sleeve surrounding said shaft and rotatable therewith and forming a fluid tight connection between said shaft and said sealing member, an inertia member surrounding said resilient sleeve and secured between said biasing means and said resilient sleeve, said inertia member and said resilient sleeve and said biasing means forming a tuned torsional vibration absorbing means the resonant frequency of which is within the range of the audible torsional oscillation of said sealing member when said sealing member is rotated by said shaft.

References Cited in the file of this patent

UNITED STATES PATENTS

| Number | Name | Date |
|---|---|---|
| 1,744,218 | Ford | Jan. 21, 1930 |
| 1,822,052 | Maccabee | Sept. 8, 1931 |
| 2,094,160 | Oldberg | Sept. 28, 1937 |
| 2,115,346 | Summers | Apr. 26, 1238 |
| 2,373,463 | Curtis | Apr. 19, 1945 |
| 2,403,298 | Payne | July 2, 1946 |
| 2,426,047 | Payne | Aug. 19, 1947 |
| 2,445,207 | Caserta | July 13, 1948 |
| 2,505,868 | Murphy | May 2, 1950 |
| 2,574,808 | Wolfe | Nov. 13, 1951 |